United States Patent
Yagasaki

(10) Patent No.: US 10,935,102 B2
(45) Date of Patent: Mar. 2, 2021

(54) METAL ELEMENT FOR CONTINUOUSLY VARIABLE TRANSMISSION AND METHOD OF PRODUCING THE SAME

(71) Applicant: Honda Motor Co., Ltd., Tokyo (JP)

(72) Inventor: Toru Yagasaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 351 days.

(21) Appl. No.: 16/045,765

(22) Filed: Jul. 26, 2018

(65) Prior Publication Data
US 2019/0032749 A1  Jan. 31, 2019

(30) Foreign Application Priority Data
Jul. 28, 2017  (JP) .............................. JP2017-146389

(51) Int. Cl.
*F16G 5/16* (2006.01)
*B21D 53/14* (2006.01)
*B21D 28/16* (2006.01)

(52) U.S. Cl.
CPC ............... *F16G 5/16* (2013.01); *B21D 28/16* (2013.01); *B21D 53/14* (2013.01)

(58) Field of Classification Search
CPC ....................................................... F16G 5/16
USPC ........................................................ 474/242
See application file for complete search history.

(56) References Cited

U.S. PATENT DOCUMENTS

| | | | | |
|---|---|---|---|---|
| 6,440,025 B1 * | 8/2002 | Ohnuki | ..................... | F16G 5/16 474/242 |
| 6,565,469 B1 * | 5/2003 | Aoyama | ................... | F16G 5/16 474/240 |
| 6,626,782 B1 * | 9/2003 | Ohsono | .................. | B21D 53/14 474/201 |
| 6,645,104 B2 * | 11/2003 | Suzuki | ................... | B21D 53/14 474/201 |

(Continued)

FOREIGN PATENT DOCUMENTS

| | | |
|---|---|---|
| CN | 1757952 | 4/2006 |
| JP | S60046340 | 3/1985 |

(Continued)

OTHER PUBLICATIONS

"Office Action of China Counterpart Application," with English translation thereof, dated Sep. 25, 2019, p. 1-p. 14.

(Continued)

*Primary Examiner* — Henry Y Liu
(74) *Attorney, Agent, or Firm* — JCIPRNET

(57) ABSTRACT

A metal element for continuously variable transmission and method of producing the same are provided. A rear surface of a metal element includes first contact parts formed at top positions on the outer side in the radial direction of a saddle surface on left and right sides of an ear part, a second contact part formed in a neck part, and third contact parts formed at a top position of the saddle surface on left and right sides of the body part. In a chord on the driving force transmission side of the metal belt, the first to third contact parts are able to be brought into contact with a front surface of another (Continued)

metal element adjacent to the rear side. A plate thickness of the metal element at the second contact part is smaller than the first contact part and is larger than the third contact part.

6 Claims, 11 Drawing Sheets

(56) References Cited

U.S. PATENT DOCUMENTS

| | | | | |
|---|---|---|---|---|
| 6,755,760 | B2 * | 6/2004 | Akagi | F16G 5/16 |
| | | | | 474/201 |
| 6,758,778 | B2 * | 7/2004 | Serkh | F16G 5/166 |
| | | | | 474/242 |
| 6,875,143 | B2 * | 4/2005 | Brandsma | F16G 5/16 |
| | | | | 474/201 |
| 7,029,411 | B2 * | 4/2006 | Van Lith | F16G 5/16 |
| | | | | 474/201 |
| 7,066,858 | B2 * | 6/2006 | Smeets | F16G 5/16 |
| | | | | 474/201 |
| 7,077,775 | B2 * | 7/2006 | Shiba | F16G 5/16 |
| | | | | 474/201 |
| 7,261,656 | B2 * | 8/2007 | Sakai | F16G 5/16 |
| | | | | 474/201 |
| 7,846,049 | B2 * | 12/2010 | Kanehara | F16G 5/16 |
| | | | | 474/201 |
| 7,963,873 | B2 * | 6/2011 | Kobayashi | F16G 5/16 |
| | | | | 474/242 |
| 8,100,797 | B2 * | 1/2012 | Prinsen | B21D 53/14 |
| | | | | 474/242 |
| 8,272,984 | B2 * | 9/2012 | Kato | F16G 5/16 |
| | | | | 474/242 |
| 9,133,908 | B2 * | 9/2015 | Van Der Sluis | F16G 5/16 |
| 9,327,339 | B2 * | 5/2016 | Kakiuchi | B21D 53/14 |
| 9,334,923 | B2 * | 5/2016 | Yagasaki | F16G 5/16 |
| 9,416,846 | B2 * | 8/2016 | van der Sluis | F16G 5/16 |
| 9,423,003 | B2 * | 8/2016 | Van Der Sluis | F16G 5/16 |
| 9,714,690 | B2 * | 7/2017 | Yagasaki | F16G 5/16 |
| 10,094,446 | B2 * | 10/2018 | Yagasaki | F16G 5/16 |
| 10,591,021 | B2 * | 3/2020 | Sumida | F16G 5/16 |
| 10,612,653 | B2 * | 4/2020 | Yagasaki | F16H 9/04 |

FOREIGN PATENT DOCUMENTS

| | | |
|---|---|---|
| JP | 561163147 | 10/1986 |
| JP | H0564254 | 9/1993 |
| JP | 2006105368 | 4/2006 |
| JP | 2007192254 | 8/2007 |
| JP | 2014145423 | 8/2014 |
| JP | 2017115959 | 6/2017 |

OTHER PUBLICATIONS

Office Action of Japan Counterpart Application, with English translation thereof, dated Jan. 23, 2019, pp. 1-9.

* cited by examiner

METAL ELEMENT FOR CONTINUOUSLY VARIABLE TRANSMISSION AND METHOD OF PRODUCING THE SAME

CROSS-REFERENCE TO RELATED APPLICATION

This application claims the priority benefit of Japan application serial no. 2017-146389, filed on Jul. 28, 2017. The entirety of the above-mentioned patent application is hereby incorporated by reference herein and made a part of this specification.

BACKGROUND

Technical Field

The disclosure relates to a plurality of metal elements for a continuously variable transmission that constitute a metal belt for a continuously variable transmission and are supported on a pair of metal rings, and a method of producing the metal element for a continuously variable transmission.

Related Art

Japanese Patent No. H5-64254 discloses that metal elements constituting a metal belt of a belt type continuously variable transmission include two thick parts at two positions on both end sides in a left-right direction of an ear part, one thick part at a center position of a neck part, and two thick parts at two positions on both end sides in the left-right direction of a body part, and when plate thicknesses of the thick parts of the body part are set to be larger than plate thicknesses of the other thick parts, it is possible to optimize compliance characteristics in a chord on a driving force transmission side of the metal belt.

However, in the above document, the plate thicknesses of the thick parts of the body part are the largest, the plate thickness of the thick part of the neck part is next largest, and the plate thicknesses of the thick parts of the ear part are the smallest. Therefore, when all of the five thick parts of the metal elements in the chord on the driving force transmission side of the metal belt are in contact with adjacent metal elements and transmit a driving force, the chord does not have a shape that is slightly curved on the outer side in the radial direction but conversely has a shape that is curved on the inner side in the radial direction. Accordingly, it is not possible for the chord on the driving force transmission side of the metal belt to maintain a stable orientation, and it may be difficult to transmit a driving force efficiently by the metal belt.

SUMMARY

One of the embodiments of the disclosure proposes a metal element for a continuously variable transmission in which a plurality of metal elements are supported on a pair of metal rings to constitute a metal belt for a continuously variable transmission. The metal element includes a pair of left and right ring slots with which the pair of metal rings are engaged, a neck part positioned between the pair of ring slots, an ear part connected to an outer side in a radial direction of the neck part, and a body part connected to an inner side in the radial direction of the neck part, and a saddle surface is formed on the body part with a crowning that supports an inner circumferential surface of the metal ring, and on a front surface of the body part, a rocking edge that extends in a left-right direction along a vicinity of a front end of the saddle surface and an inclined surface that extends from the rocking edge on the inner side in the radial direction to a rear side are formed, wherein a rear surface of the metal element includes a pair of left and right first contact parts that are formed at top positions on the outer side in the radial direction of the saddle surface on both left and right sides of the ear part, a second contact part that is formed in the neck part, and a pair of left and right third contact parts that are formed at top positions of the saddle surface on both left and right sides of the body part, and in a chord on a driving force transmission side of the metal belt, the first contact parts, the second contact part, and the third contact parts are able to be brought into contact with a front surface of another metal element adjacent to the rear side, and a plate thickness of the metal element at the second contact part is smaller than a plate thickness of the metal element at the first contact parts and is larger than a plate thickness of the metal element at the third contact parts.

In addition, one of the embodiments of the disclosure proposes a method of producing a metal element for a continuously variable transmission including producing the metal element according to the above mentioned metal element by pressing a plate-like metal element component having a certain cross section using a main punch and a counter punch, wherein an inclination angle of an inclined surface correspondence part of the metal element component matches an inclination angle of an inclined surface molding part of the counter punch.

DESCRIPTION OF THE EMBODIMENTS

Figure 1:
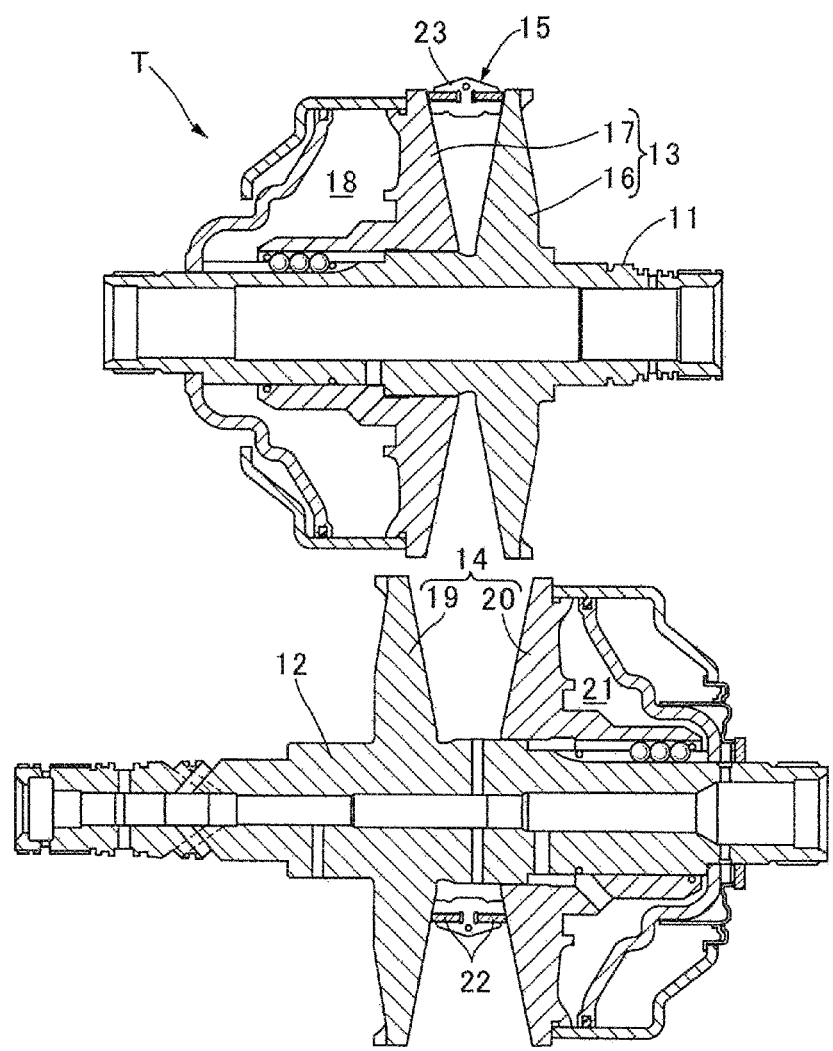
FIG. 1 is a diagram showing the entire configuration of a belt type continuously variable transmission.

The disclosure improves the driving force transmission performance by maintaining a stable orientation in a chord on a driving force transmission side of a metal belt of a belt type continuously variable transmission.

In addition, an embodiment proposes a metal element for a continuously variable transmission proposes in which, in addition to the configuration of the above embodiment, the plate thicknesses of the first contact parts, the second contact part, and the third contact parts are set as an average value of those of the plurality of metal elements.

In addition, an embodiment proposes a method of producing a metal element for a continuously variable transmission in which, in addition to the configuration of the above embodiment, a rear surface of the metal element includes a first concave part that is formed between the pair of left and right first contact parts and a second concave part that is formed in the neck part, the main punch includes a first concave part molding part that molds the first concave part and a second concave part molding part that molds the second concave part, and a protrusion height of the first concave part molding part is greater than a protrusion height of the second concave part molding part.

According to the configuration of the above embodiment, since the metal element includes the rocking edge that extends in a left and right direction along the vicinity of a front end of the saddle surface, when the metal element pitches around the rocking edge at a winding part in which the metal belt is wound around the pulley, sliding occurring between the saddle surface of the metal element and the metal ring supported thereon is reduced to a minimum and the power transmission efficiency is improved.

In addition, a rear surface of the metal element includes a pair of left and right first contact parts that are formed at top positions on the outer side in the radial direction of the saddle surface on both left and right sides of the ear part, a second contact part that is formed in the neck part, and a pair of left and right third contact parts that are formed at a top position of the saddle surface on both left and right sides of the body part, and in a chord on the driving force transmission side of the metal belt, the first contact parts, the second contact part, and the third contact parts are able to be brought into contact with a front surface of another metal element adjacent to the rear side, and a plate thickness of the metal element at the second contact part is smaller than a plate thickness of the metal element at the first contact parts and is larger than a plate thickness of the metal element at the third contact parts. Therefore, the first contact parts, the second contact part, and the third contact parts are positioned substantially on the same plane, and in a chord on the driving force transmission side of the metal belt, the first contact parts, the second contact part and the third contact parts are brought into substantially uniform contact with a front surface of an adjacent metal element, pitching of the metal element is prevented, the rigidity of the metal belt increases, and thus the power transmission efficiency is improved.

In addition, in a winding part in which the metal belt is wound around the pulley, when two adjacent metal elements relatively pitch around the rocking edge so that an interval between the outer ends thereof in the radial direction increases, the pair of left and right first contact parts and second contact part of the front metal element are separated from the rear metal element. However, the pair of left and right third contact parts of the front metal element are still in contact with the rear metal element. Therefore, yawing of the metal element is prevented and the orientation is stabilized. Therefore, not only the power transmission efficiency is improved but also abnormal wear of the pulley and the metal element is prevented.

In addition, according to the configuration of the above embodiment, the plate thicknesses of the first contact parts, the second contact part and the third contact parts are set as an average value of those of the plurality of metal elements. Therefore, it is possible to obtain desired operation effects while reducing the plate thickness accuracy of each metal element and reducing production costs.

In addition, according to the configuration of the above embodiment, since an inclination angle of the inclined surface correspondence part of the metal element component matches an inclination angle of the inclined surface molding part of the counter punch, when the metal element is pressed using a counter punch and a main punch, an amount of a material pushed out from the body part correspondence part of the metal element by the counter punch decreases. Therefore, plate thicknesses of the parts of the rocking edge can be uniformized.

In addition, according to the configuration of the above embodiment, the rear surface of the metal element includes a first concave part that is formed between a pair of left and right first contact parts and a second concave part that is formed in the neck part. The main punch includes a first concave part molding part that molds the first concave part and a second concave part molding part that molds the second concave part. A protrusion height of the first concave part molding part is greater than a protrusion height of the second concave part molding part. Therefore, when the metal element component is pressed, the counter punch and the main punch are relatively inclined so that a distance therebetween on the side of the ear part of the metal element increases. Thus, the first contact parts, the second contact part and the third contact parts of the metal element can be automatically set to have a desired plate thickness relationship.

Embodiments of the disclosure will be described below with reference to FIG. 1 to FIGS. 11(A) and 11(B).

FIG. 1 shows a schematic structure of a belt type continuously variable transmission T mounted on an automobile. The belt type continuously variable transmission T includes a drive shaft 11 connected to an engine and a driven shaft 12 connected to a drive wheel. An endless metal belt 15 is wound around a drive pulley 13 provided on the drive shaft 11 and a driven pulley 14 provided on the driven shaft 12. The drive pulley 13 includes a fixed side pulley half 16 fixed to the drive shaft 11 and a movable side pulley half 17 that is detachable from the fixed side pulley half 16. The movable side pulley half 17 is biased toward the fixed side pulley half 16 with hydraulic pressure that acts on an oil chamber 18. The driven pulley 14 includes a fixed side pulley half 19 fixed to the driven shaft 12 and a movable side pulley half 20 that is detachable from the fixed side pulley half 19. The movable side pulley half 20 is biased toward the fixed side pulley half 19 with hydraulic pressure that acts on an oil chamber 21.

Figure 2:
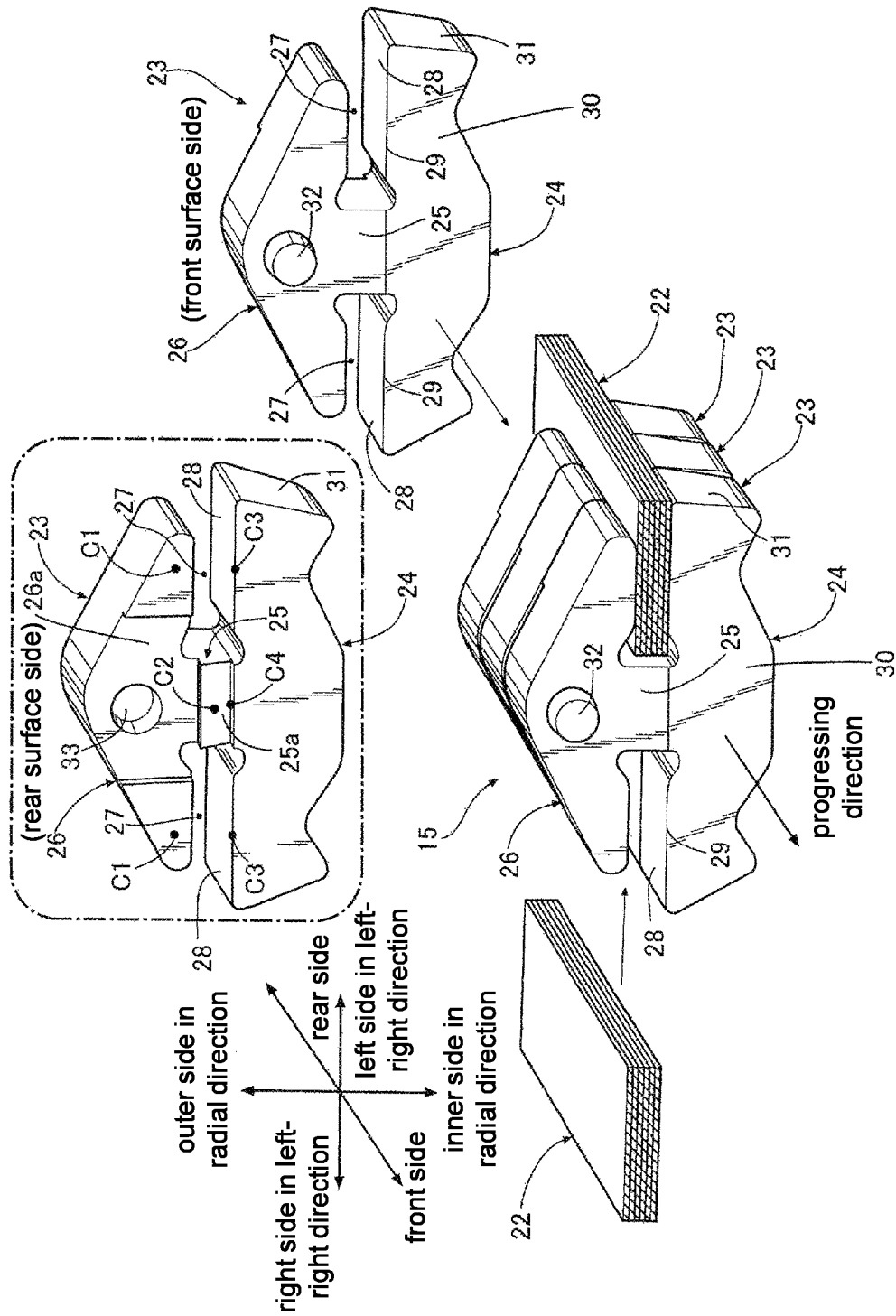
FIG. 2 is a perspective view of a metal belt and a metal element.
Figure 3:
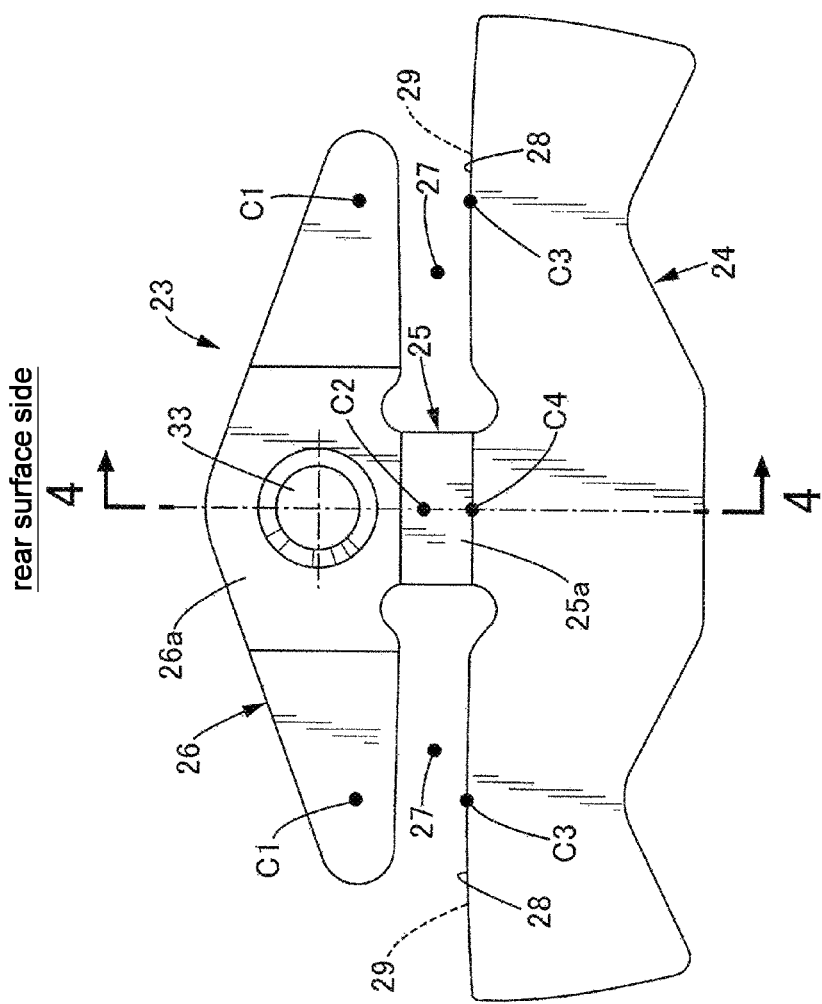
FIG. 3 is a rear view of the metal element.
Figure 4:
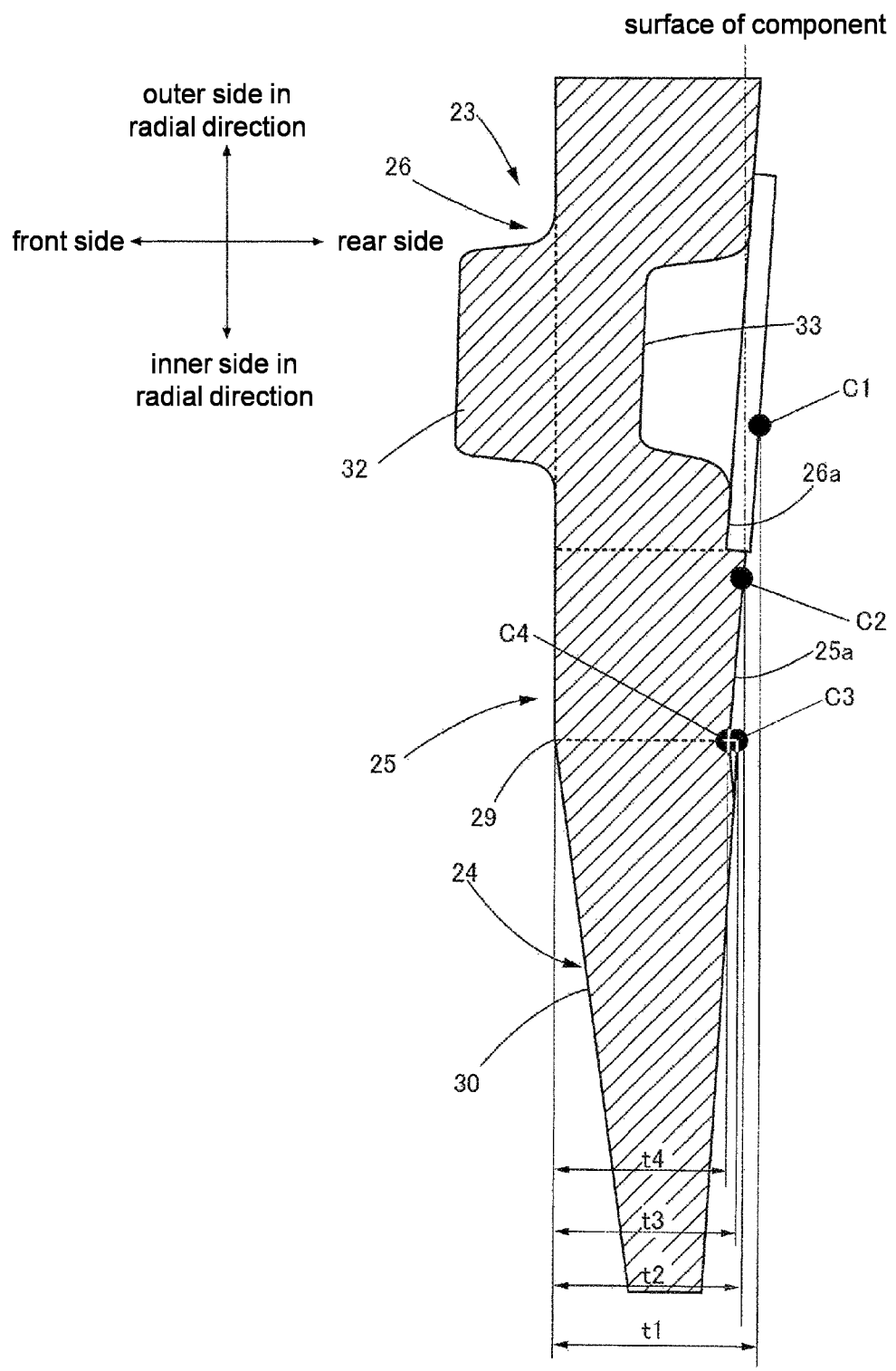
FIG. 4 is a cross-sectional view taken along the line 4-4 in FIG. 3.

As shown in FIG. 2 to FIG. 4, in the metal belt 15, a plurality of metal elements 23 are supported on a pair of left and right metal rings 22. In this specification, a direction in which the metal belt 15 travels is defined as forward in the front and rear direction, the outer circumferential side of the drive pulley 13 and the driven pulley 14 is defined as the outer side in the radial direction while the metal belt 15 is wound around the drive pulley 13 and the driven pulley 14, and a direction orthogonal to the front and rear direction and the radial direction is defined as a left and right direction. In addition, directions corresponding to the front and rear direction, the radial direction, and the left-right direction in the metal element 23 are defined as a front and rear direction, a radial direction and a left-right direction in a metal element component 23' (refer to FIG. 5) serving as a component of the metal element 23 and a punching machine 41 (refer to FIG. 6) that molds and punches the metal element 23 from the metal element component 23'.

The metal element 23 produced from the metal element component 23' includes a body part 24 that extends in the left and right direction, a neck part 25 that extends from the center of the body part 24 in the left-right direction to the outside in the radial direction and a substantially triangular ear part 26 that is connected to the outer end of the neck part 25 in the radial direction. A pair of ring slots 27 which open to the outer side in the left-right direction between the body part 24, the neck part 25, and the ear part 26 and with which the metal ring 22 is engaged are formed. At the outer end in the radial direction of the body part 24 that faces the ring slot 27, a saddle surface 28 on which the inner circumferential surface of the metal ring 22 is seated is formed. At the outer end in the radial direction of the front surface of the body part 24 connected to the saddle surface 28, a rocking edge 29 that extends in the left-right direction is formed. In addition, an inclined surface 30 inclined to the inner side in the radial direction and the rear side from the rocking edge 29 is formed on the front surface of the body part 24.

The left and right saddle surfaces 28 are subjected to crowning in which the center in the left-right direction is curved into an arc shape so that the outer side in the radial direction bulges. According to the crowning, the metal ring 22 is centered on the saddle surface 28 in the left and right direction. A straight line connecting the front ends of the tops of the crowned left and right saddle surfaces 28 in the left-right direction constitutes the rocking edge 29 serving as a supporting point at which the metal element 23 pitches.

At both left and right ends of the body part 24 of the metal element 23, a pulley contact surface 31 that is in contact with V surfaces of the drive pulley 13 and the driven pulley 14 is formed. In addition, on the front surface of the ear part 26 of the metal element 23, a truncated conical nose 32 that can be engaged with a truncated conical hole 33 formed in the rear surface of the ear part 26 is formed.

As can be clearly understood from FIG. 3, on the rear surface of the metal element 23, a first concave part 26*a* surrounding the periphery of the hole 33 of the ear part 26 is formed. In addition, in the neck part 25 of the metal element 23, a second concave part 25*a* that intersects the neck part 25 in the left-right direction is formed. The depth (for example, several tens of μm) of the first concave part 26*a* is set to be deeper than the depth (for example, several μm) of the second concave part 25*a*.

As a result, as shown in FIG. 3 and FIG. 4, on the rear surface of the metal element 23, a pair of left and right first contact parts C1 positioned on both left and right sides of the ear part 26 on the outer side in the radial direction of the tops of the left and right saddle surfaces 28, a second contact part C2 positioned on the outer side in the radial direction of the neck part 25, and a pair of left and right third contact parts C3 positioned at the rear ends of the tops of the left and right saddle surfaces 28 are formed. Here, the pair of left and right first contact parts C1 are defined as parts at a predetermined position on both left and right sides on the rear surface of the ear part 26. In addition, the second contact part C2 is defined as a part at a predetermined position on the outer side in the radial direction of the rear surface of the neck part 25.

As can be clearly understood from FIG. 4, front and rear direction plate thicknesses of the first contact part C1, the second contact part C2, and the third contact part C3 of the metal element 23 are not uniform but they are slightly different. A plate thickness t1 of the first contact part C1 of the ear part 26 positioned on the outer side in the radial direction is the largest, a plate thickness t2 of the second contact part C2 of the neck part 25 positioned in the middle in the radial direction is the next largest, and a plate thickness t3 of the third contact part C3 at the outer end in the radial direction of the body part 24 positioned on the inner side in the radial direction is the smallest. That is, the tips of the first contact part C1, the second contact part C2, and the third contact part C3 are substantially on the same plane, and the plate thickness t1 of the first contact part C1>the plate thickness t2 of the second contact part C2>the plate thickness t3 of the third contact part C3 is set.

Figure 5:
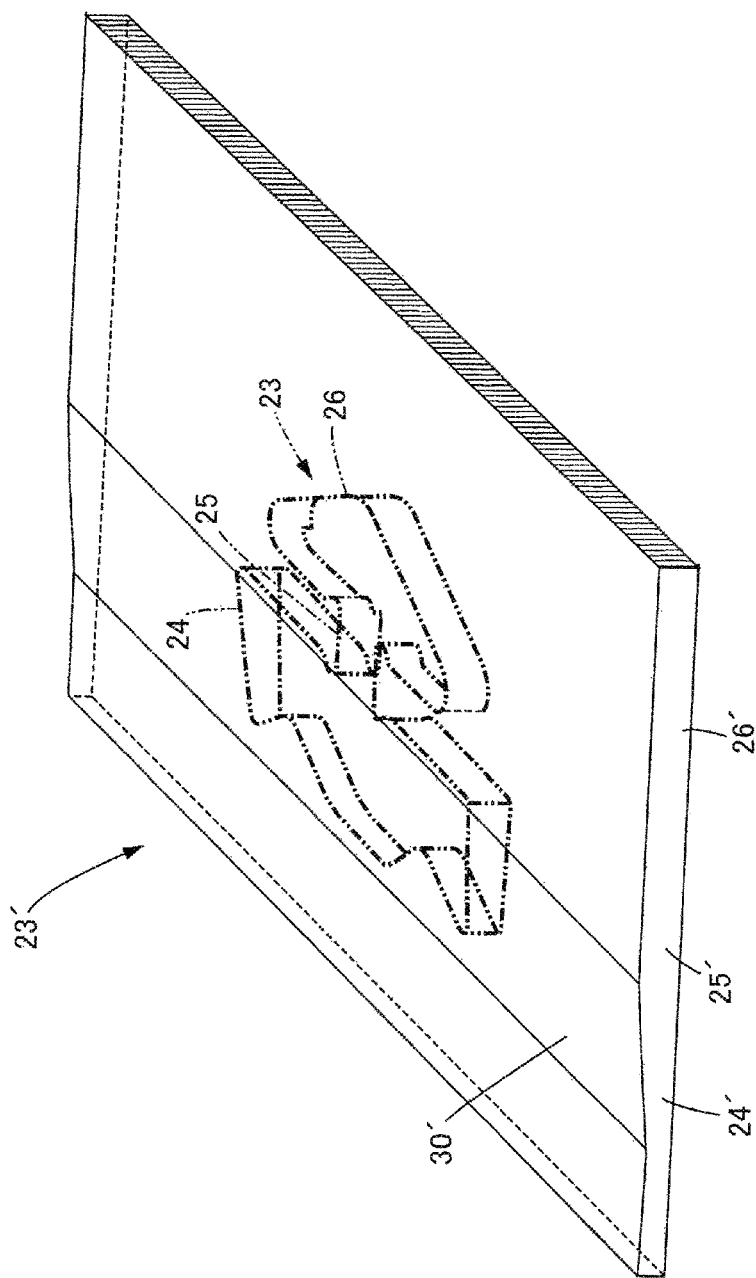
FIG. 5 is a perspective view of a metal element component.

As shown in FIG. 5, the metal element component 23' serving as a component when the metal element 23 is produced is made of a plate-like metal plate that is rolled so that it has a certain cross section in the longitudinal direction. The metal element component 23' includes an ear part correspondence part 26', a neck part correspondence part 25' and a body part correspondence part 24' which correspond to the ear part 26, the neck part 25, and the body part 24 of the metal element 23, respectively. In addition, a part including the ear part correspondence part 26' and the neck part correspondence part 25' of the metal element component 23' has a certain plate thickness, and a part including the body part correspondence part 24' of the metal element component 23' has a plate thickness that decreases on the inner side in the radial direction.

Figure 6:
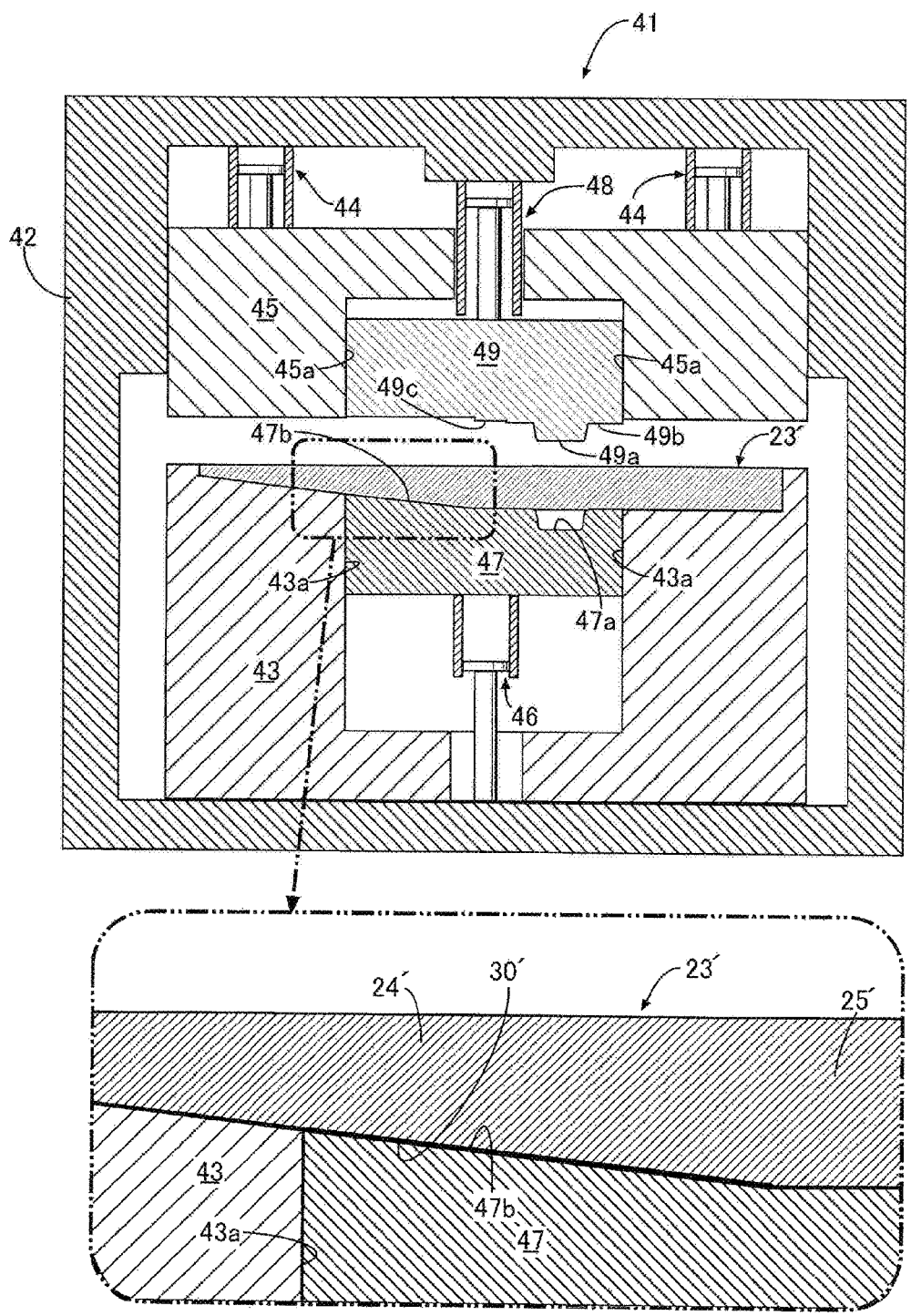
FIG. 6 is a cross-sectional view of a punching device and a metal element component.

As shown in FIG. 6, the punching machine 41 for punching the metal element 23 from the metal element component 23' includes a lower die 43 fixed to a lower part of a frame 42, an upper die 45 which is supported on an upper part of the frame 42 in a freely ascending and descending manner and is driven to move up and down by a die drive cylinder 44, a counter punch 47 which is driven to move up and down by a counter punch drive cylinder 46 engaged with a concave part 43*a* which is formed on the lower die 43 and of which an upper surface is open, and a main punch 49 which is driven to move up and down by a main punch drive cylinder 48 engaged with a concave part 45*a* which is formed on the upper die 45 and of which a lower surface is open.

The contour shapes of the counter punch 47 and the main punch 49 are the same as the contour shape of the metal element 23. In the counter punch 47, a nose molding part 47*a* for molding the nose 32 of the metal element 23, and an inclined surface molding part 47*b* for molding the inclined surface 30 of the metal element 23 are formed. In the main punch 49, a hole molding part 49*a* for molding the hole 33 of the metal element 23, a first concave part molding part 49*b* for molding the first concave part 26*a* of the ear part 26 of the metal element 23, and a second concave part molding part 49*c* for molding the second concave part 25*a* of the neck part 25 of the metal element 23 are formed.

The inclined surface molding part 47*b* of the counter punch 47 is parallel to an inclined surface correspondence part 30' of the metal element component 23'. In addition, a protrusion height of the first concave part molding part 49*b* of the main punch 49 is set to be greater than a protrusion height of the second concave part molding part 49*c*.

Next, operations and effects according to the shape of the metal element 23 having the above configuration will be described.

Figure 10:
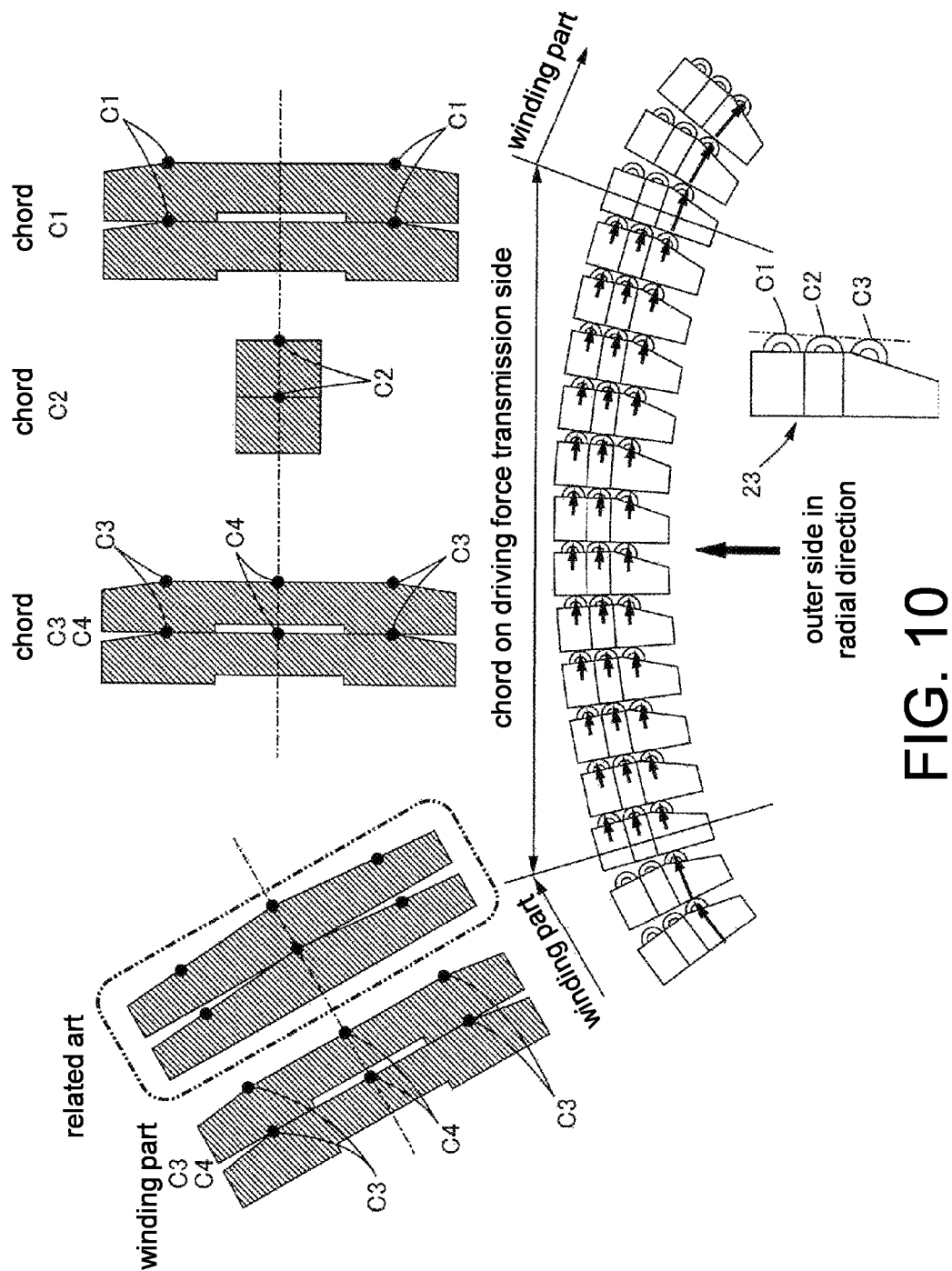
FIG. 10 is an explanatory diagram showing a movement of the metal element in a chord on a driving force transmission side.

As shown in FIG. 10, the metal belt 15 wound around the drive pulley 13 and the driven pulley 14 transmits a driving force according to a pushing force of a chord on the driving force transmission side that extends from the drive pulley 13 toward the driven pulley 14. In the chord on the driving force transmission side, the metal elements 23 are arranged substantially parallel to each other. However, in a winding part in which the metal belt 15 is wound around the pulleys 13 and 14, the metal element 23 changes its orientation radially around the axis of the pulleys 13 and 14. Therefore, relative swinging occurs such that an interval between the outer ends in the radial direction of the adjacent metal elements 23 increases and an interval between the inner ends in the radial direction decreases. In this case, the rocking edge 29 of the rear metal element 23 that is in contact with the rear surface of the front metal element 23 serves as a supporting point, and the front and rear metal elements 23 relatively pitch in a range of a gap between the nose 32 and the hole 33 so that the orientation can be changed.

According to the present embodiment, since the rocking edge 29 passes through the tops of the left and right saddle surfaces 28, when the metal element 23 pitches around the rocking edge 29, sliding occurring between the saddle surface 28 of the metal element 23 and the metal ring 22 supported thereon is reduced to a minimum, and the power transmission efficiency is improved.

In addition, in a winding part in which the metal belt 15 is wound around the pulleys 13 and 14, two adjacent metal elements 23 relatively pitch around the rocking edge 29 so that an interval between the outer ends thereof in the radial direction increases. Therefore, the pair of left and right first contact parts C1 and the second contact part C2 of the front metal element 23 are separated from the rear metal element 23. However, the pair of left and right third contact parts C3 of the front metal element 23 are still in contact with the rear metal element 23. As a result, yawing of the metal element 23 is prevented and the orientation is stabilized. Therefore, not only the power transmission efficiency is improved but also abnormal wear of the V surfaces of the pulleys 13 and 14 and the contact part of the metal element 23 is prevented.

In addition, in the chord on the driving force transmission side of the metal belt 15, when the plurality of metal elements 23 are in contact with each other and transmit a driving force, the first contact part C1 of the ear part 26 of the front metal element 23, the second contact part C2 of the neck part 25, and the third contact part C3 of the body part 24 are in contact with the front surface of the rear metal element 23. However, since the plate thickness of the metal element 23 is set such that the plate thickness t1 of the first contact part C1>the plate thickness t2 of the second contact part C2>the plate thickness t3 of the third contact part C3, the first to third contact parts C1 to C3 are not lifted at all and are brought into substantially uniform contact with the front surface of the adjacent metal element 23, and can maintain a stable contact state. As a result, pitching of the metal element 23 in the chord on the driving force transmission side of the metal belt 15 is prevented and a decrease in power transmission efficiency is avoided.

In this case, since the plate thickness of the metal element 23 is set to be slightly thick on the outer side in the radial direction and set to be slightly thin on the inner side in the radial direction, the chord on the driving force transmission side of the metal belt 15 is slightly curved on the outer side in the radial direction and a stable orientation is maintained (refer to FIG. 10), and the metal belt 15 can stably transmit a driving force.

Next, operations and effects in the process of producing the metal element 23 will be described.

Figure 7:
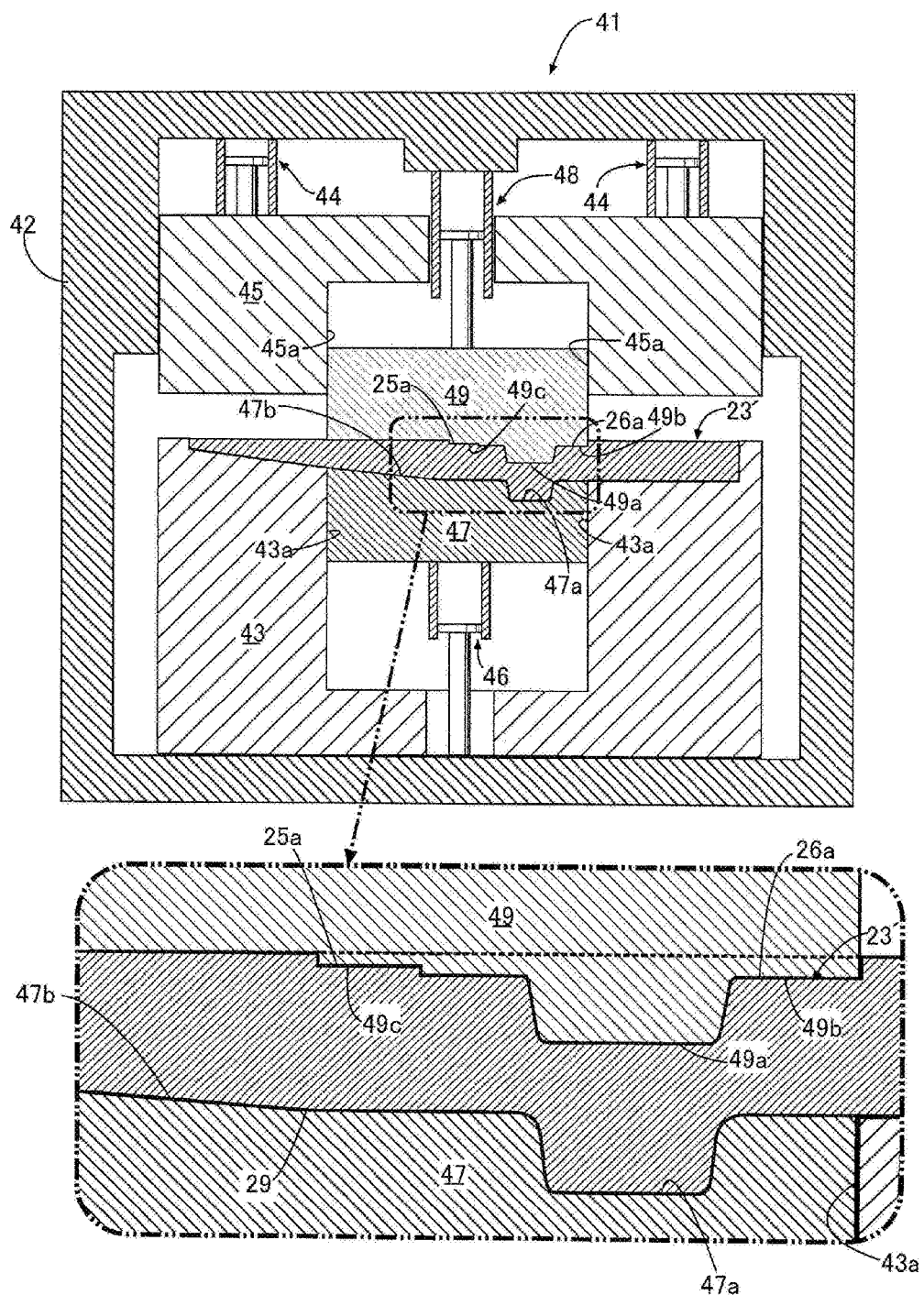
FIG. 7 is an operation explanatory diagram corresponding to FIG. 6.

As shown in FIG. 6, the metal element component 23' produced in advance is placed on the lower die 43 and the counter punch 47 of the punching machine 41. Next, as shown in FIG. 7, the upper die 45 is lowered by the die drive cylinder 44, and the metal element component 23' is interposed between the lower die 43 and the upper die 45 and fixed. Then, the main punch 49 is lowered by the main punch drive cylinder 48, and the metal element component 23' is interposed between the counter punch 47 and the main punch 49 and pressing is applied thereto.

As a result, according to the nose molding part 47a of the counter punch 47 and the hole molding part 49a of the main punch 49, the nose 32 and the hole 33 of the metal element 23 are molded. The inclined surface 30 of the metal element 23 is molded by the inclined surface molding part 47b of the counter punch 47. The first concave part 26a of the metal element 23 is molded by the first concave part molding part 49b of the main punch 49. The second concave part 25a of the metal element 23 is molded by the second concave part molding part 49c.

Figure 8:
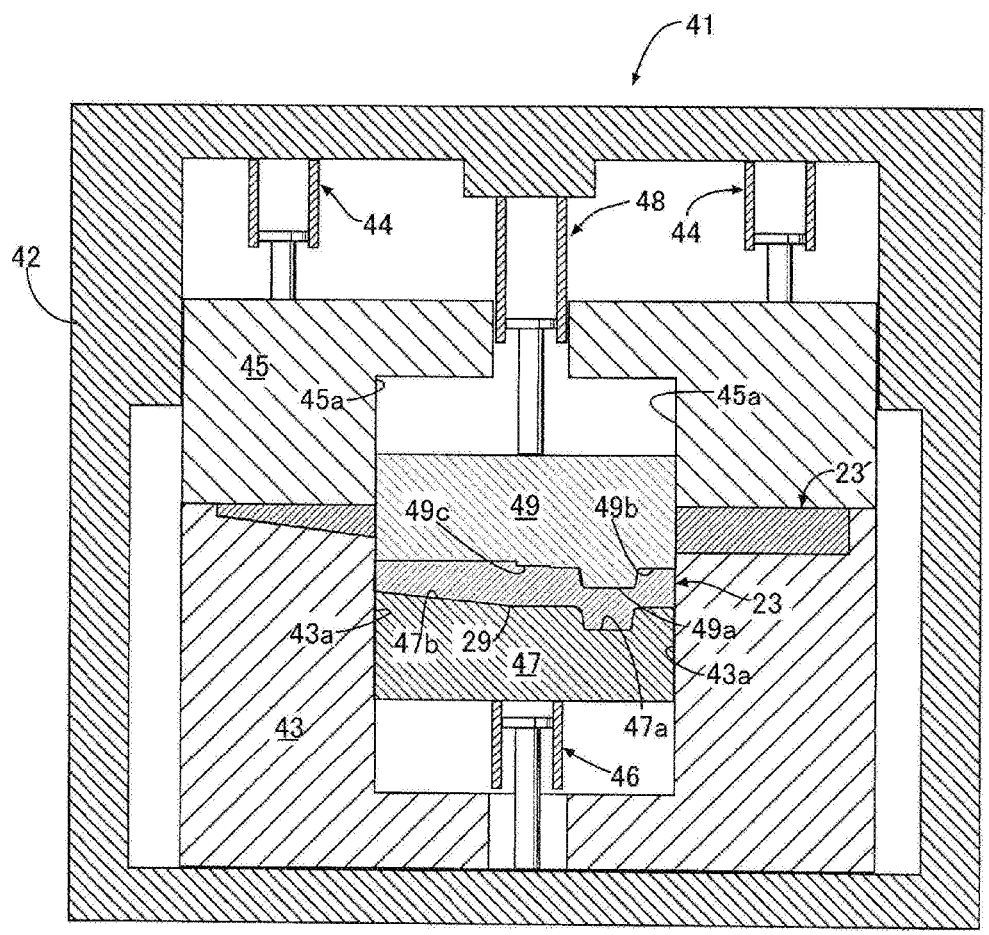
FIG. 8 is an operation explanatory diagram corresponding to FIG. 6.
Figure 9:
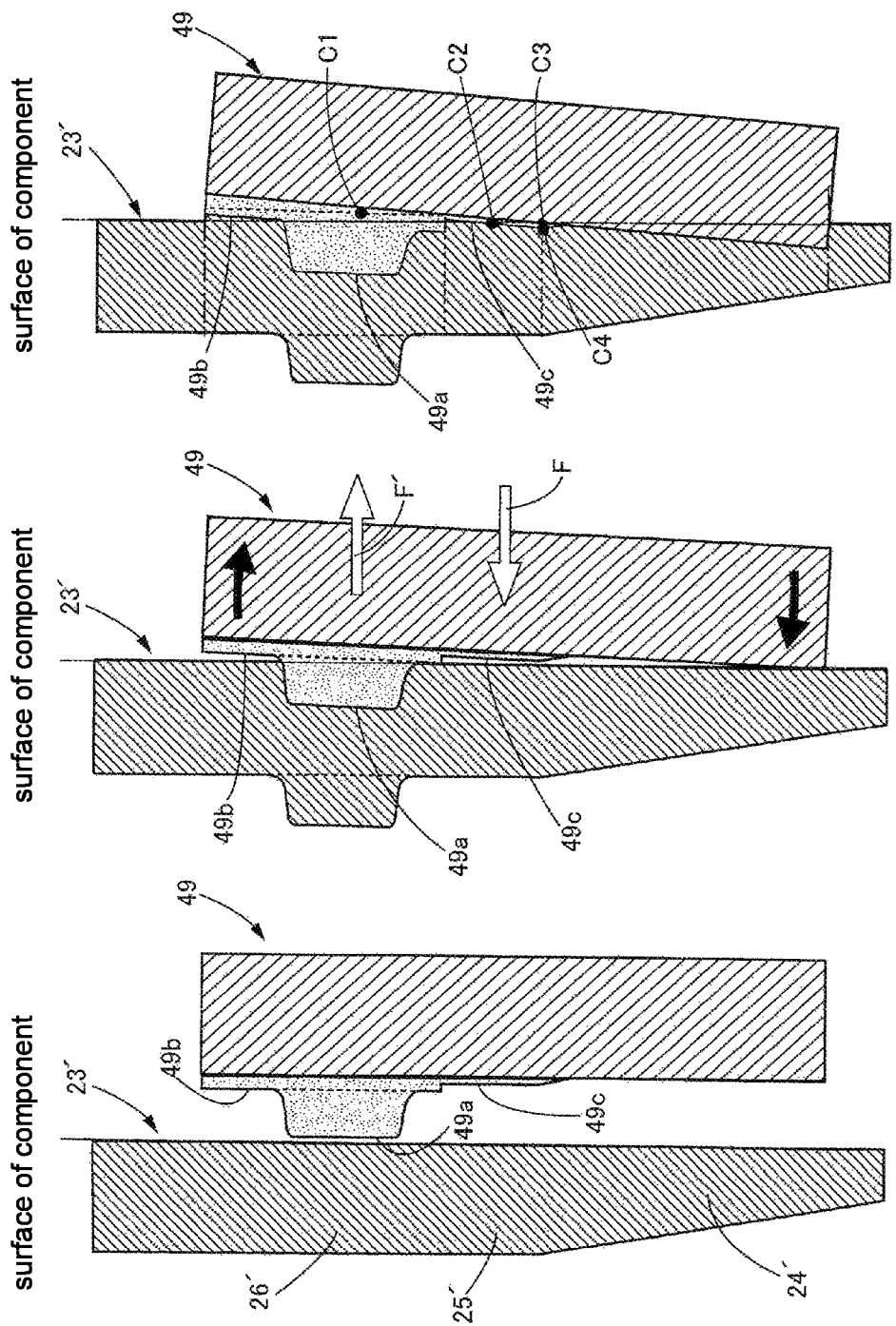
FIGS. 9(A)~9(C) are operation explanatory diagrams when a metal element is pressed.

In this manner, when press molding of the metal element 23 is completed, as shown in FIG. 8, when the counter punch 47 and the main punch 49 are relatively lowered by the counter punch drive cylinder 46 and the main punch drive cylinder 48 with respect to the lower die 43 and the upper die 45, the metal element 23 is punched from the metal element component 23'.

Here, when the metal element 23 is molded using the counter punch 47 and the main punch 49, the counter punch 47 and the main punch 49 are relatively inclined so that a distance therebetween on the side of the ear part 26 of the metal element 23 increases. In the metal element 23, plate thickness differences such as the plate thickness t1 of the first contact part C1>the plate thickness t2 of the second contact part C2>the plate thickness t3 of the third contact part C3 are automatically generated.

Next, the reason why the above plate thickness differences are generated will be described in detail with reference to FIG. 4 and FIGS. 9(A)~9(C). As shown in FIG. 9(A), in a state before pressing is started, the main punch 49 is parallel to the metal element component 23'. However, as shown in FIG. 9(B), when the main punch 49 approaches the metal element 23, first, the hole molding part 49a of the main punch 49 and the first concave part molding part 49b having a large protrusion amount are brought into contact with the metal element component 23', and later the second concave part molding part 49c having a small protrusion amount is brought into contact with the metal element component 23'. Therefore, a reaction load F' to a press load F acts on a part on the outer side in the radial direction of the main punch 49 and thus the main punch 49 is slightly inclined with respect to the metal element component 23' and the counter punch 47 (refer to a black arrow). Then, as shown in FIG. 9(C), according to the hole molding part 49a of the inclined main punch 49, the first concave part molding part 49b and the second concave part molding part 49c, the hole 33, the first concave part 26a, and the second concave part 25a are molded on the back surface of the metal element 23.

As a result, as shown in FIG. 4, when a part of a material pushed out from the first concave part molding part 49b from a component surface of the metal element component 23' flows on the left and right rear surfaces of the ear part 26, the plate thickness t1 at the left and right first contact parts C1 is slightly thicker than an initial plate thickness of the metal element component 23'. On the other hand, since the rear surface of the body part 24 is pressed by the inclined main punch 49 and is depressed from the component surface and the thickness thereof becomes thinner than the initial plate thickness of the metal element component 23', the plate thickness of the third contact part C3 at the outer end in the radial direction of the body part 24 is slightly thinner than the initial plate thickness of the metal element component 23'.

In addition, on the rear surface of the neck part 25 of the metal element 23, the second concave part 25a is molded by the second concave part molding part 49c. However, in a part on the outer side in the radial direction of the neck part 25, a tip surface of the second concave part forming part 49c does not reach the component surface, and the second concave part 25a is not partially molded, and a material of the first concave part 26a and the second concave part 25a flows into the space. On the other hand, since the second concave part 25a is molded by the second concave part forming part 49c in a part on the inner side in the radial direction of the neck part 25, the plate thickness t2 of the second contact part C2 which is an intermediate part in the radial direction of the neck part 25 is the same as the plate thickness of the metal element component 23'.

In addition, a plate thickness t4 at a position C4 at the inner end in the radial direction on the rear surface of the neck part 25 of the metal element 23, that is, a plate thickness t4 at the position C4 between the pair of left and right third contact parts C3 is thinner than the plate thickness at the third contact part C3 by the depth of the second concave part 25a. As a result, the plate thickness t1 of the first contact part C1, the plate thickness t2 of the second contact part C2, the plate thickness t3 of the third contact part C3 and the plate thickness t4 at the position C4 have a relationship of t1>t2>t3>t4.

Here, ideally, each of the plurality of metal elements 23 constituting the metal belt 15 satisfies a plate thickness distribution relationship of t1>t2>t3>t4. However, in order to satisfy this relationship, high processing accuracy is required and this may result in an increase in costs. However, when an average value of plate thicknesses of a predetermined number of metal elements 23 satisfies a plate thickness distribution relationship of t1>t2>t3>t4, the above operation and effects can be achieved. The predetermined number is, for example, the number of metal elements 23 included in the chord on the drive transmission side of the metal belt 15.

In addition, if an inclination angle of the inclined surface molding part 47b of the counter punch 47 does not match an inclination angle of the inclined surface correspondence part 30' of the metal element component 23', a material of the body part correspondence part 24 of the metal element component 23' pushed out from the inclined surface molding part 47b of the counter punch 47 flows to the outer side in the radial direction, and an amount of the material flowing to the side of the saddle surface 28 and an amount of a material flowing to the side of the neck part 25 are unbalanced. Therefore, the plate thickness (the position C3 and the position C4 in FIG. 4) of the metal element 23 along the rocking edge 29 may become non-uniform.

However, according to the present embodiment, an inclination angle of the inclined surface molding part 47b of the counter punch 47 matches an inclination angle of the inclined surface correspondence part 30' of the metal element component 23' in advance, and the inclined surface molding part 47b is unlikely to push out a material of the body part correspondence part 24' of the metal element component 23'. Therefore, the plate thickness (the position C3 and the position C4 in FIG. 4) of the metal element 23 along the rocking edge 29 becomes uniform and it is possible to increase molding accuracy of the rocking edge 29.

Figure 11B:
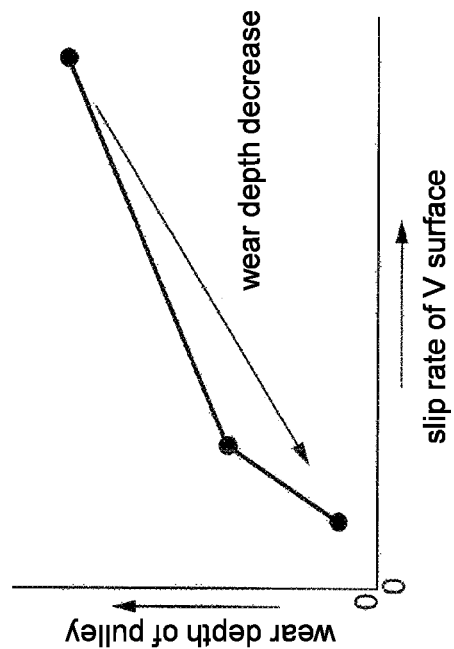
FIGS. 11(A) and 11(B) are graphs explaining effects of an embodiment.
Figure 11A:
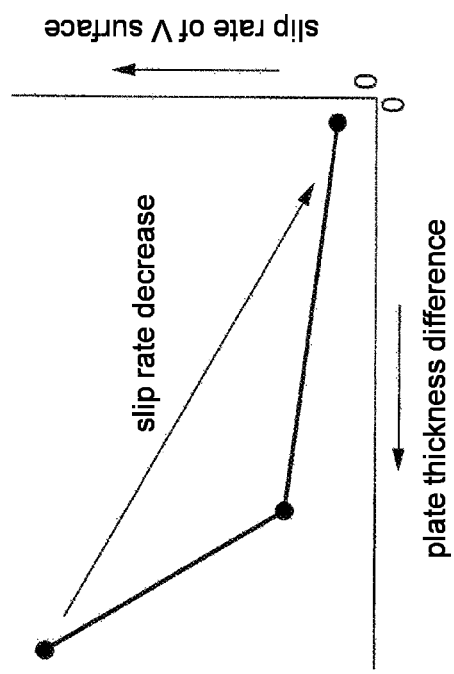

That is, as shown in FIG. 11(A), it can be understood that, when a difference between the plate thickness at the position C3 and the plate thickness at the position C4 in the metal element 23 approaches zero, a slip rate of the metal element 23 with respect to V surfaces of pulleys 14 and 15 decreases, and as a result, as shown in FIG. 11(B), the wear depth of the pulleys 14 and 15 decreases.

While the embodiments of the disclosure have been described above, various design modifications can be made without departing from the spirit and scope of the disclosure.

What is claimed is:

1. A metal element for a continuously variable transmission in which a plurality of metal elements are supported on a pair of metal rings to constitute a metal belt for a continuously variable transmission, the metal element comprises
   a pair of left and right ring slots with which the pair of metal rings are engaged;
   a neck part positioned between the pair of ring slots;
   an ear part connected to an outer side in a radial direction of the neck part; and
   a body part connected to an inner side in the radial direction of the neck part, and a saddle surface is formed on the body part with a crowning that supports an inner circumferential surface of the metal ring, and
   on a front surface of the body part, a rocking edge that extends in a left-right direction along a vicinity of a front end of the saddle surface and an inclined surface that extends from the rocking edge on the inner side in the radial direction to a rear side are formed,
   wherein a rear surface of the metal element includes a pair of left and right first contact parts that are formed at top positions on the outer side in the radial direction of the saddle surface on both left and right sides of the ear part, a second contact part that is formed in the neck part, and a pair of left and right third contact parts that are formed at top positions of the saddle surface on both left and right sides of the body part, and
   in a chord on a driving force transmission side of the metal belt, the first contact parts, the second contact part, and the third contact parts are able to be brought into contact with a front surface of another metal element adjacent to the rear side, and
   a plate thickness of the metal element at the second contact part is smaller than a plate thickness of the metal element at the first contact parts and is larger than a plate thickness of the metal element at the third contact parts.

2. The metal element for a continuously variable transmission according to claim 1,
   wherein the plate thicknesses of the first contact parts, the second contact part, and the third contact parts are set as an average value of those of the plurality of metal elements.

3. A method of producing a metal element for a continuously variable transmission comprising:
   producing the metal element for a continuously variable transmission according to claim 1 by pressing a plate-like metal element component having a cross section using a main punch and a counter punch,
   wherein an inclination angle of an inclined surface correspondence part of the metal element component matches an inclination angle of an inclined surface molding part of the counter punch.

4. A method of producing a metal element for a continuously variable transmission comprising:
   producing the metal element for a continuously variable transmission according to claim 2 by pressing a plate-like metal element component having a cross section using a main punch and a counter punch,
   wherein an inclination angle of an inclined surface correspondence part of the metal element component matches an inclination angle of an inclined surface molding part of the counter punch.

5. The method of producing a metal element for a continuously variable transmission according to claim 3,
wherein a rear surface of the metal element includes a first concave part that is formed between the pair of left and right first contact parts and a second concave part that is formed in the neck part,
the main punch includes a first concave part molding part that molds the first concave part and a second concave part molding part that molds the second concave part, and
a protrusion height of the first concave part molding part is greater than a protrusion height of the second concave part molding part.

6. The method of producing a metal element for a continuously variable transmission according to claim 4,
wherein a rear surface of the metal element includes a first concave part that is formed between the pair of left and right first contact parts and a second concave part that is formed in the neck part,
the main punch includes a first concave part molding part that molds the first concave part and a second concave part molding part that molds the second concave part, and
a protrusion height of the first concave part molding part is greater than a protrusion height of the second concave part molding part.

* * * * *